US012640438B2

(12) United States Patent (10) Patent No.: US 12,640,438 B2
Ka et al. (45) Date of Patent: May 26, 2026

(54) SEPARATOR FOR SECONDARY BATTERY, METHOD FOR MANUFACTURING THE SAME AND SECONDARY BATTERY INCLUDING THE SAME

(71) Applicant: LG ENERGY SOLUTION, LTD., Seoul (KR)

(72) Inventors: Kyung-Ryun Ka, Daejeon (KR); Hye-Jin Kwon, Daejeon (KR); Seung-Hyun Lee, Daejeon (KR); Je-An Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 618 days.

(21) Appl. No.: 17/927,664

(22) PCT Filed: Jul. 13, 2021

(86) PCT No.: PCT/KR2021/008986
§ 371 (c)(1),
(2) Date: Nov. 23, 2022

(87) PCT Pub. No.: WO2022/015026
PCT Pub. Date: Jan. 20, 2022

(65) Prior Publication Data
US 2023/0238651 A1 Jul. 27, 2023

(30) Foreign Application Priority Data
Jul. 17, 2020 (KR) ........................ 10-2020-0089137

(51) Int. Cl.
*H01M 50/451* (2021.01)
*H01M 10/052* (2010.01)
(Continued)

(52) U.S. Cl.
CPC ....... *H01M 50/451* (2021.01); *H01M 10/052* (2013.01); *H01M 50/426* (2021.01);
(Continued)

(58) Field of Classification Search
CPC ............. H01M 50/446; H01M 50/449; H01M 50/451; H01M 50/461; H01M 10/052; H01M 10/0525
See application file for complete search history.

(56) References Cited

U.S. PATENT DOCUMENTS

| | | | | |
|---|---|---|---|---|
| 4,863,792 A | * | 9/1989 | Mrozinski | C08J 9/28 |
| | | | | 156/308.2 |
| 2005/0260490 A1 | * | 11/2005 | Persi | H01M 50/463 |
| | | | | 429/144 |

(Continued)

FOREIGN PATENT DOCUMENTS

| | | |
|---|---|---|
| EP | 3 675 229 A1 | 7/2020 |
| JP | 2013-191389 A | 9/2013 |

(Continued)

OTHER PUBLICATIONS

Extended European Search Report for European Application No. 21843543.6, dated Oct. 25, 2024.

(Continued)

*Primary Examiner* — Jeremiah R Smith
(74) *Attorney, Agent, or Firm* — Birch, Stewart, Kolasch & Birch, LLP

(57) ABSTRACT

A separator for a secondary battery, including a porous polymer substrate; a porous coating layer on at least one surface of the porous polymer substrate. The porous coating layer includes a plurality of inorganic particles and a first binder polymer that interconnects and fixes the inorganic particles; and an adhesive layer on a surface of the porous coating layer opposite to the porous polymer substrate. The (Continued)

adhesive layer includes a second binder polymer, and the adhesive layer includes a first layer in contact with the surface of the porous coating layer opposite to the porous polymer substrate, and a second layer integrated with the first layer and the second layer faces an electrode. The second layer has an average pore size larger than the average pore size of the first layer. The separator for a secondary battery can improve the problem related with resistance, while ensuring adhesion to an electrode.

11 Claims, 4 Drawing Sheets

(51) Int. Cl.

| | |
|---|---|
| *H01M 50/426* | (2021.01) |
| *H01M 50/446* | (2021.01) |
| *H01M 50/449* | (2021.01) |
| *H01M 50/46* | (2021.01) |
| *H01M 50/491* | (2021.01) |

(52) U.S. Cl.
CPC ....... *H01M 50/446* (2021.01); *H01M 50/449* (2021.01); *H01M 50/461* (2021.01); *H01M 50/491* (2021.01)

(56) References Cited

U.S. PATENT DOCUMENTS

| | | | | |
|---|---|---|---|---|
| 2009/0117455 | A1* | 5/2009 | Takita | H01G 9/02 |
| | | | | 264/45.9 |
| 2017/0173535 | A1* | 6/2017 | Jiang | B01D 67/0069 |
| 2017/0346057 | A1* | 11/2017 | Kai | H01M 50/429 |
| 2018/0034025 | A1* | 2/2018 | Lee | H01M 50/457 |
| 2018/0047962 | A1* | 2/2018 | Honda | C09J 7/26 |
| 2018/0309108 | A1 | 10/2018 | Shin et al. | |
| 2019/0044118 | A1 | 2/2019 | Sakurai et al. | |
| 2020/0185676 | A1 | 6/2020 | Lee et al. | |
| 2020/0251708 | A1* | 8/2020 | Kwon | H01R 24/64 |
| 2020/0321587 | A1 | 10/2020 | Kim et al. | |
| 2021/0184314 | A1* | 6/2021 | Jang | H01M 50/42 |
| 2023/0072302 | A1* | 3/2023 | Ramkumar | H01M 8/1081 |
| 2023/0231231 | A1* | 7/2023 | Reinartz | H01M 50/434 |
| | | | | 429/100 |

FOREIGN PATENT DOCUMENTS

| | | | |
|---|---|---|---|
| KR | 10-2016-0054936 A | 5/2016 | |
| KR | 10-2017-0027433 A | 3/2017 | |
| KR | 10-2017-0027437 A | 3/2017 | |
| KR | 10-1745631 B1 | 6/2017 | |
| KR | 10-2017-0113474 A | 10/2017 | |
| KR | 10-2019-0015105 A | 2/2019 | |
| KR | 10-2019-0092307 A | 8/2019 | |
| KR | 10-2019-0092316 A | 8/2019 | |
| KR | 10-2019-0140870 A | 12/2019 | |
| KR | 10-2020-0012802 A | 2/2020 | |
| WO | WO-2019117605 A1 * | 6/2019 | .......... H01M 50/457 |

OTHER PUBLICATIONS

International Search Report for PCT/KR2021/008986 (PCT/ISA/210) mailed on Oct. 25, 2021.

* cited by examiner

SEPARATOR FOR SECONDARY BATTERY, METHOD FOR MANUFACTURING THE SAME AND SECONDARY BATTERY INCLUDING THE SAME

TECHNICAL FIELD

The present application claims priority to Korean Patent Application No. 10-2020-0089137 filed on Jul. 17, 2020 in the Republic of Korea, the disclosures of which are incorporated herein by reference.

The present disclosure relates to a separator for a secondary battery, a method for manufacturing the same and a secondary battery including the separator.

BACKGROUND ART

Recently, energy storage technology has been given an increasing attention. As the application of energy storage technology has been extended to energy for cellular phones, camcorders and notebook PC and even to energy for electric vehicles, there has been an increasing need for providing a battery used as a power source of such electronic instruments with high energy density. Since secondary batteries are those capable of satisfying such a need to the highest degree, active studies have been conducted about secondary batteries.

In general, such a secondary battery includes a positive electrode including a positive electrode active material, a negative electrode including a negative electrode active material, a non-aqueous electrolyte including an electrolyte salt and an organic solvent, and a separator interposed between the positive electrode and the negative electrode and configured to insulate both electrodes electrically from each other.

Securement of safety of such secondary batteries is an important problem to be solved in manufacturing and using the secondary batteries. The separator generally uses a polyolefin-based porous substrate. However, the separator has a safety-related problem, such as an internal short-circuit, since it shows a severe heat shrinking behavior at high temperature due to its material property and a characteristic during its manufacturing process. Recently, there has been suggested an organic-inorganic composite porous separator having a porous coating layer formed by coating a mixture of inorganic particles with a binder polymer on a porous polymer substrate in order to solve the above-mentioned problem.

However, such an organic-inorganic composite porous separator has a problem in that it shows insufficient interlayer adhesion, when forming an electrode assembly through the lamination with electrodes, due to its material property, and thus may cause separation of the electrodes and the separator from each other.

To solve this, there has been developed a method which includes coating a binder polymer mixture on the separator, and allowing the binder polymer to migrate toward the surface of the separator though a vapor-induced phase separation process to form an adhesive layer having a high content of binder polymer in the vicinity of the surface of the separator.

However, in this case, there is a problem in that the binder polymer functions as resistance to cause deterioration of the output and cycle characteristics of the battery using the separator.

Therefore, there is still a need for a technology capable of solving the above-mentioned problem by improving the above-mentioned problem related with resistance, while ensuring sufficient adhesion to an electrode despite the use of the porous coating layer including inorganic particles.

DISCLOSURE

Technical Problem

The present disclosure is designed to solve the problems of the related art, and therefore the present disclosure is directed to providing a separator for a secondary battery, which can ensure adhesion to an electrode and improve a problem related with resistance despite the use of a porous coating layer including inorganic particles, and a secondary battery including the same.

The present disclosure is also directed to providing a method for manufacturing a separator for a secondary battery which can ensure adhesion to an electrode and improve a problem related with resistance despite the use of a porous coating layer including inorganic particles.

Technical Solution

In one aspect of the present disclosure, there is provided a separator for a secondary battery according to any one of the following embodiments.

According to the first embodiment, there is provided a separator for a secondary battery, including:

a porous polymer substrate;

a porous coating layer on at least one surface of the porous polymer substrate, wherein the porous coating layer includes a plurality of inorganic particles and a first binder polymer that interconnects and fixes the inorganic particles; and an adhesive layer on a surface of the porous coating layer opposite to the porous polymer substrate, wherein the adhesive layer includes a second binder polymer, wherein the adhesive layer includes a first layer in contact with the surface of the porous coating layer opposite to the porous polymer substrate, and a second layer integrated with the first layer and the second layer faces an electrode, and the second layer has an average pore size larger than the average pore size of the first layer.

According to the second embodiment, there is provided the separator for a secondary battery as defined in the first embodiment, wherein the ratio of the average pore size of the first layer to the average pore size of the second layer may be 0.75 or less.

According to the third embodiment, there is provided the separator for a secondary battery as defined in the first or the second embodiment, wherein the ratio of the average pore size of the first layer to the average pore size of the second layer may be 0.4 or less.

According to the fifth embodiment, there is provided the separator for a secondary battery as defined in any one of the first to the fourth embodiments, wherein the first layer may have an average pore size of 0.1-7 μm.

According to the sixth embodiment, there is provided the separator for a secondary battery as defined in any one of the first to the fifth embodiments, wherein the first binder polymer may include an acrylic polymer, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxymethyl cellulose, acrylonitrile-styrene-butadiene copolymer, polyimide, or two or more of them.

According to the seventh embodiment, there is provided the separator for a secondary battery as defined in any one of the first to the sixth embodiments, wherein the second binder polymer may include polyvinylidene fluoride-co-hexafluoropropylene, polyvinylidene fluoride-co-trichloroethylene, polyvinylidene fluoride-co-tetrafluoroethylene, polyvinylidene fluoride-co-trifluoroethylene, or two or more of them.

According to the eighth embodiment, there is provided the separator for a secondary battery as defined in any one of the first to the seventh embodiments, which may show an adhesion to an electrode of 60-250 gf/25 mm.

According to the ninth embodiment, there is provided the separator for a secondary battery as defined in any one of the first to the eighth embodiments, which may have an air permeability of 10-500 s/100 cc.

According to the tenth embodiment, there is provided the separator for a secondary battery as defined in any one of the first to the ninth embodiments, which may show an electric resistance of 0.1-3Ω.

In another aspect of the present disclosure, there is provided a secondary battery according to the following embodiment.

According to the eleventh embodiment, there is provided a secondary battery including a positive electrode, a negative electrode and a separator interposed between the positive electrode and the negative electrode, wherein the separator is the same as defined in any one of the first to the tenth embodiments.

Advantageous Effects

The separator for a secondary battery according to an embodiment of the present disclosure includes: a porous coating layer containing inorganic particles; and an adhesive layer including a first layer that is in contact with the surface of the porous coating layer, and a second layer integrated with the first layer and facing an electrode, wherein the second layer has an average pore size larger than the average pore size of the first layer. In this manner, the separator can be provided with thermal stability, while solving the problem related with resistance and ensuring adhesion to an electrode.

The separator for a secondary battery according to an embodiment of the present disclosure ensures linear propagation of lithium ions by virtue of the first layer having a smaller average pore size than the average pore size of the second layer, and thus can improve the problem related with the resistance of a separator, caused by an adhesive layer.

In addition, the separator for a secondary battery according to an embodiment of the present disclosure ensures the adhesion between the separator and an electrode by virtue of the second layer having a larger average pore size than the average pore size of the first layer and reduces the contact area between the separator and the electrode, thereby improving the problem related with resistance.

The separator for a secondary battery according to an embodiment of the present disclosure includes an adhesive layer in which the average pore size of the second layer is larger than the average pore size of the first layer, and thus can provide improved air permeability.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Specific terms used in the following description are for the convenience of description and understanding, and the scope of the present disclosure is not limited thereto. The terms, 'one surface' or 'top surface' represents a position or direction in drawings to which reference is made, and is not used for limitary purposes. Such terms include the above-listed words, derivatives thereof and synonyms thereof.

Throughout the specification, the expression 'one layer is disposed on the top surface of another layer' covers not only an embodiment in which one layer is in contact with one surface of another layer but also an embodiment in which still another layer is present between the two layers.

As used herein, the terms 'a first', 'a second', or the like are used to differentiate one constitutional element from another constitutional element, and each constitutional element is not limited to such terms.

In one aspect of the present disclosure, there is provided a separator for a secondary battery, including:

a porous polymer substrate;

a porous coating layer formed on at least one surface of the porous polymer substrate, and including a plurality of inorganic particles and a first binder polymer for interconnecting and fixing the inorganic particles; and an adhesive layer formed on the top surface of the porous coating layer and including a second binder polymer, wherein the adhesive layer includes a first layer that is in contact with the surface of the porous coating layer, and a second layer integrated with the first layer and facing an electrode, and the second layer has an average pore size larger than the average pore size of the first layer.

Figure 1:
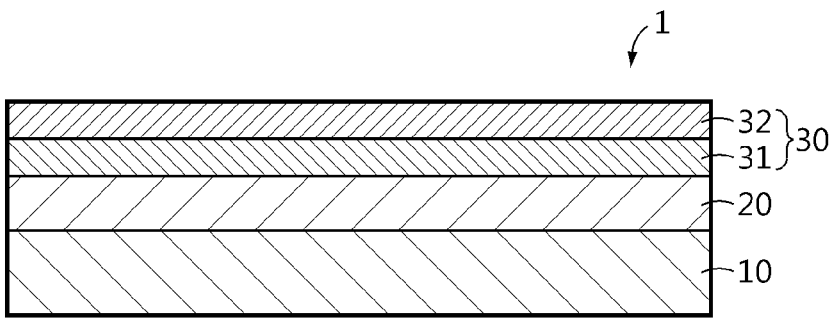
FIG. 1 is a sectional view illustrating the separator for a secondary battery according to an embodiment of the present disclosure.

FIG. 1 is a schematic view illustrating the separator for a secondary battery according to an embodiment of the present disclosure.

Referring to FIG. 1, the separator 1 for a secondary battery is provided with a porous polymer substrate 10.

According to an embodiment of the present disclosure, the porous polymer substrate 10 is not particularly limited, as long as it may be used conventionally as a separator material for a secondary battery. The porous polymer substrate may be a thin film including a polymer material. Non-limiting examples of the polymer material may include at least one selected from polymer resins, such as polyolefin resins, polyethylene terephthalate, polybutylene terephthalate, polyacetal, polyamide, polycarbonate, polyimide, polyether ether ketone, polyether sulfone, polyphenylene oxide, polyphenylene sulfide and polyethylene naphthalene. In addition, the porous polymer substrate may be a non-woven web or a porous polymer film including such a polymer material, or a laminate including two or more of them. Particularly, the porous polymer substrate may be any one of the following a) to e):

a) A porous film formed by melting and extruding a polymer resin;

b) A multilayer film formed by stacking two or more layers of the porous films of a);

c) A non-woven web formed by integrating filaments obtained by melting/spinning a polymer resin;

d) A multilayer film formed by stacking two or more layers of the non-woven webs of c); and e) A porous composite film having a multilayer structure including two or more of a) to d).

According to an embodiment of the present disclosure, the porous polymer substrate 10 may have a thickness of 5-50 μm. The thickness of the porous polymer substrate is not limited to the above-defined range. However, when the thickness is within the above-defined range, it is easier to prevent the separator from being damaged easily during the use of a battery. Meanwhile, although the average pore size and porosity of the pores present in the porous polymer substrate are not limited particularly, the pore size and porosity may be 0.01-50 μm and 10-95%, respectively.

As used herein, the term 'average pore size' means the average of pore sizes. The pore sizes refer to average diameters of pores, and the average diameters mean the average values of the longest diameters and shortest diameters of pores.

According to the present disclosure, the porosity and average pore size of the porous polymer substrate 10 may be determined by using 6-point BET method according to a nitrogen gas adsorption-flow method, scanning electron microscope (SEM) image, Mercury porosimeter, capillary flow porosimeter, or porosimetry analyzer (Bell Japan Inc, Belsorp-II mini).

Referring to FIG. 1, the separator 1 for a secondary battery is provided with a porous coating layer 20 on at least one surface of the porous polymer substrate 10. Particularly, the porous coating layer 20 may be formed on one surface or both surfaces of the porous polymer substrate 10.

The porous coating layer 20 includes a plurality of inorganic particles (not shown) and a first binder polymer (not show) with which the inorganic particles are attached so that they may retain their binding states (in other words, the first binder polymer connects the inorganic particles with one another and fixes them). In addition, the inorganic particles and the porous polymer substrate 10 may retain their binding states by the first binder polymer. The inorganic particles of the porous coating layer 20 prevents the porous polymer substrate 10 from exhibiting a severe heat shrinking behavior, thereby providing the separator with improved safety.

There is no particular limitation in the inorganic particles, as long as they are electrochemically stable. In other words, there is no particular limitation in the inorganic particles that may be used herein, as long as they cause no oxidation and/or reduction in the range (e.g. 0-5 V based on $Li/Li^+$) of operating voltage of an applicable battery.

According to an embodiment of the present disclosure, the inorganic particles may include high-dielectric constant inorganic particles having a dielectric constant of 5 or more, or 10 or more. Non-limiting examples of the inorganic particles having a dielectric constant of 5 or more may include any one selected from $BaTiO_3$, $BaSO_4$, $Pb(Zr, Ti)O_3$ (PZT), $Pb_{1-x}La_xZr_{1-y}Ti_yO_3$ (PLZT, wherein $0<x<1$, and $0<y<1$), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, $Mg(OH)_2$, NiO, CaO, ZnO, $ZrO_2$, $Y_2O_3$, $SiO_2$, $Al_2O_3$, $\gamma$-AlOOH, $Al(OH)_3$, SiC, $TiO_2$, or the like, or a mixture of two or more of them. However, the scope of the present disclosure is not limited thereto.

According to another embodiment of the present disclosure, the inorganic particles may include inorganic particles having lithium-ion transportability, i.e. inorganic particles which contain lithium elements and do not store lithium but transport lithium ions. Non-limiting examples of the inorganic particles having lithium-ion transportability may include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), (LiAlTiP)$_xO_y$-based glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$-based glass ($Li_xSi_yS_z$, $0<x<3$, $0<y<2$, $0<z<4$), and $P_2S_5$-based glass ($Li_xP_yS_z$, $0<x<3$, $0<y<3$, $0<z<7$), or two or more of them.

According to an embodiment of the present disclosure, although there is no particular limitation in the particle diameter of the inorganic particles of the porous coating layer, the inorganic particles may have an average particle diameter of about 0.01-10 μm or about 0.05-1.0 μm with a view to formation of a coating layer having a uniform thickness and suitable porosity. When the average particle diameter of the inorganic particles satisfies the above-defined range, the inorganic particles are easier to maintain dispersibility to facilitate controlling the physical properties of a separator for a lithium secondary battery. In addition, it is easier to avoid an increase in thickness of the porous coating layer to improve the mechanical properties. Further, it is less likely that an internal short-circuit occurs during the charge/discharge of a battery due to an excessively large pore size.

The term 'average particle diameter of the inorganic particles' means a $D_{50}$ particle diameter, and '$D_{50}$ particle diameter' means a particle diameter at a point of 50% in the particle number accumulated distribution depending on particle diameter. The particle diameter may be determined by using a laser diffraction method. Particularly, powder to be analyzed is dispersed in a dispersion medium and introduced to a commercially available laser diffraction particle diameter analyzer (e.g. Microtrac S3500), and then a difference in diffraction pattern depending on particle diameter is determined, when particles pass through laser beams, and then particle diameter distribution is calculated. Then, the particle diameter at a point of 50% of the particle number accumulated distribution depending on particle diameter is calculated to determine $D_{50}$.

According to an embodiment of the present disclosure, the first binder polymer may include an acrylic polymer, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxymethyl cellulose, acrylonitrile-styrene-butadiene copolymer, polyimide, or two or more of them.

Particularly, according to an embodiment of the present disclosure, the acrylic polymer may include an acrylate polymer. For example, the acrylate polymer may include polybutyl acrylate, ethyl acrylate-acrylic acid-N,N-dimethylacrylamide copolymer, ethyl acrylate-acrylic acid-2-(dimethylamino)ethyl acrylate copolymer, ethyl acrylate-acrylic acid-N,N-diethylacrylamide copolymer, ethyl acrylate-acrylic acid-2-(d-ethylamino)ethyl acrylate copolymer, or two or more of them, but is not limited thereto.

According to an embodiment of the present disclosure, the weight ratio of the inorganic particles to the first binder polymer may be determined considering the thickness, average pore size and porosity of a finished porous coating layer 20. The weight ratio of the inorganic particles to the first binder polymer may be 20:80-99.9:0.1, or 50:50-99.5:0.5. When the weight ratio of the inorganic particles to the first binder polymer satisfies the above-defined range, it is easier to ensure vacant spaces formed among the inorganic particles sufficiently, while ensuring sufficient adhesion among the inorganic particles. In addition, the finished porous coating layer 20 may have excellent mechanical properties.

According to an embodiment of the present disclosure, the porous coating layer 20 may have a thickness of 1-50 μm, 2-30 μm, or 2-20 μm.

According to an embodiment of the present disclosure, the porous coating layer 20 may have an average pore size of 0.001-10 μm, or 0.001-1 μm. In addition, the porous coating layer 20 may have a porosity of 5-95%, 10-95%, 20-90%, or 30-80%. The porosity corresponds to a value obtained by subtracting the volume expressed from the weight and density of each ingredient in the porous coating layer, from the volume calculated from the thickness, width and length of the porous coating layer.

According to the present disclosure, the porosity and average pore size of the porous coating layer 20 may be determined by using 6-point BET method according to a nitrogen gas adsorption-flow method, scanning electron microscope (SEM) image, Mercury porosimeter, capillary flow porosimeter, or porosimetry analyzer (Bell Japan Inc, Belsorp-II mini).

Referring to FIG. 1, the separator 1 for a secondary battery is provided with an adhesive layer 30 including a second binder polymer, on the top surface of the porous coating layer 20. The adhesive layer 30 imparts adhesion to the separator 1 so that the surface of the separator 1 may be adhered well to an electrode.

According to an embodiment of the present disclosure, the second binder polymer may include polyvinylidene fluoride-co-hexafluoropropylene, polyvinylidene fluoride-co-trichloroethylene, polyvinylidene fluoride-co-tetrafluoroethylene, polyvinylidene fluoride-co-trifluoroethylene, or two or more of them.

Referring to FIG. 1, the adhesive layer 30 includes a first layer 31 that is in contact with the surface of the porous coating layer 20, and a second layer 32 integrated with the first layer 31 and facing an electrode. The second layer 32 has an average pore size larger than the average pore size of the first layer 31.

In the separator 1 for a secondary battery according to the present disclosure, the first layer 21 and the second layer 32 are not formed separately from each other but are integrated with each other to form a single adhesive layer 30. As used herein, the terms 'first layer' and 'second layer' refer to layers present in the adhesive layer 30 and different from each other in terms of average pore size.

According to an embodiment of the present disclosure, the ratio of the average pore size of the first layer based on the average pore size of the second layer may be 0.75 or less, 0.7 or less, or 0.25-0.7, 0.4 or less, 0.25-0.4, or 0.25 or less. When the ratio of the average pore size of the first layer based on the average pore size of the second layer satisfies the above-defined range, the first layer may have a smaller average pore size to provide reduced tortuosity, and thus the problem related with resistance can be further improved. In addition, the second layer may have a larger average pore size so that the adhesion between the separator and an electrode may be further ensured and the contact area between the separator and the electrode may be further minimized, and thus the problem related with resistance can be further improved.

Particularly, when the ratio of the average pore size of the first layer 31 based on the average pore size of the second layer 32 is 0.4 or less, the problem related with resistance can be further improved, and the adhesion between the separator and the electrode can be further improved.

In the separator 1 for a secondary battery according to the present disclosure, the first layer 31 is formed on the top surface of the porous coating layer 20 in such a manner that it is in contact with the surface of the porous coating layer 20. Since the average pore size of the first layer 31 is smaller than the average pore size of the second layer 32, it is possible to ensure linear propagation of lithium ions. In other words, it is possible to minimize reverse transport of lithium ions, and thus to solve the problem related with the resistance of the separator, caused by the second binder polymer of the adhesive layer 30.

According to an embodiment of the present disclosure, the first layer 31 may have an average pore size of 0.1-7 μm, 0.1-5 μm, or 0.5-2 μm. When the average pore size of the first layer 31 satisfies the above-defined range, the tortuosity may be further reduced to facilitate improvement of the problem related with resistance.

In the separator 1 for a secondary battery according to the present disclosure, the second layer 32 is formed at a portion where the separator is adhered with an electrode. The second layer 32 has an average pore size larger than the average pore size of the first layer 31. By virtue of the second layer 32, it is possible to improve the problem related with resistance by reducing the contact area between the separator and the electrode, while ensuring adhesion between the separator and the electrode.

According to an embodiment of the present disclosure, the second layer 32 may be provided with a well-developed Bernard cell pore structure. The Bernard cell pore structure refers to a pore structure formed in a net-like shape through the partial opening in a portion including a binder polymer. When the second layer 32 is provided with the Bernard cell pore structure, it is possible to realize significantly high adhesion between the separator and the electrode.

According to an embodiment of the present disclosure, the second layer 32 may have an average pore size of 0.1-10 μm, or 1-4 μm. When the average pore size of the second layer satisfies the above-defined range, the adhesion between the separator and the electrode may be further ensured and the contact area between the separator and the electrode may be further minimized, and thus the problem related with resistance can be further improved.

Particularly, when the second layer 32 has an average pore size of 1-4 μm, it is possible to minimize the contact area between the separator and the electrode and to further improve the problem related with resistance, while providing higher adhesion between the separator and the electrode.

In addition, when the second layer 32 has an average pore size of 3-4 μm, a Bernard cell structure can be developed well to further minimize the contact area between the separator and the electrode and to further improve the problem related with resistance, while providing even higher adhesion between the separator and the electrode.

According to an embodiment of the present disclosure, when the second layer 32 may have an average pore size of 0.1-10 μm, and the first layer 31 may have an average pore size smaller than the average pore size of the second layer 32 and ranging from 0.1 μm to 7 μm.

According to an embodiment of the present disclosure, the average pore size of the first layer 31 and that of the second layer 32 may be determined from scanning electron microscopic (SEM) images or through pore size distribution (PSD). For example, the average pore size may be determined by using a mercury porosimeter.

The separator for a secondary battery according to an embodiment of the present disclosure includes a first layer that is in contact with the surface of the porous coating layer, and a second layer integrated with the first layer and facing an electrode, wherein the second layer has an average pore size larger than the average pore size of the first layer. In this manner, it is possible to provide excellent air permeability, to improve the problem related with resistance and to realize excellent adhesion to an electrode.

According to an embodiment of the present disclosure, the separator for a secondary battery may show an adhesion to an electrode of 60-200 gf/25 mm, or 100-200 gf/25 mm.

According to an embodiment of the present disclosure, the adhesion to an electrode of the separator for a secondary battery may be determined by manufacturing an electrode, laminating the electrode with the separator by using a press at 60° C. under 6.54 MPa to obtain a specimen, attaching and fixing the specimen to a glass plate by using a double-sided tape, and measuring the strength when peeling the separator portion of the specimen at 25° C. at a rate of 25 mm/min and an angle of 180°.

According to an embodiment of the present disclosure, the separator for a secondary battery may have an air permeability of 10-500 s/100 cc, 10-300 s/100 cc, 100-300 s/100 cc, 200-300 s/100 cc, or 200-250 s/100 cc.

According to an embodiment of the present disclosure, the air permeability refers to Gurley value and means a time (second), i.e. air permeation time, required for 100 cc of air to pass through a section of separator having an area of 1 in$^2$ under a pressure of 12.2 inH$_2$O. The air permeability of the separator for a secondary battery may be determined according to the method of ASTM D726-94.

According to an embodiment of the present disclosure, the separator for a secondary battery may show an electrical resistance of 0.1-3Ω, 0.1-2Ω, or 0.5-1Ω.

According to an embodiment of the present disclosure, the electrical resistance may be calculated by manufacturing a coin cell and measuring the impedance of the separator as a function of frequency by using electrochemical impedance spectroscopy (EIS).

The separator for a secondary battery according to an embodiment of the present disclosure may be manufactured by the following method, but is not limited thereto.

The method for manufacturing a separator for a secondary battery according to an embodiment of the present disclosure includes the steps of:

preparing a porous polymer substrate;

coating slurry including inorganic particles, a first binder polymer and a solvent for the first binder polymer on at least one surface of the porous polymer substrate, followed by drying, to form a porous coating layer;

coating a coating solution including a second binder polymer, a solvent for the second binder polymer and a non-solvent for the second binder polymer on the top surface of the porous coating layer; and drying the coated coating solution, while maintaining a relative humidity of 35-40%, to form an adhesive layer, wherein the non-solvent has a boiling point different from the boiling point of water.

Hereinafter, the method for manufacturing a separator for a secondary battery according to an embodiment of the present disclosure will be explained in detail with reference to the key parts thereof.

First, a porous polymer substrate is prepared. The porous polymer substrate may be one described hereinbefore. The porous polymer substrate may be obtained from the above-mentioned materials by forming pores therein through a method known to those skilled in the art as a method for ensuring excellent air permeability and porosity, for example, a wet process using a solvent, a diluent or a pore-forming agent, or a dry process using an orientation process.

Next, slurry including inorganic particles, a first binder polymer and a solvent for the first binder polymer is coated on at least one surface of the porous polymer substrate, followed by drying, to form a porous coating layer.

According to an embodiment of the present disclosure, the slurry may be coated on one surface or both surfaces of the porous polymer substrate.

According to an embodiment of the present disclosure, reference will be made to the above description about the types of inorganic particles and the first binder polymer and the weight ratio of the inorganic particles to the first binder polymer.

Herein, the solvent for the first binder polymer may function as a solvent capable of dissolving the first binder polymer, or as a dispersion medium which does not dissolve the first binder but disperses the first binder, depending on the particular type of the first binder polymer. For example, the solvent for the first binder polymer may include acetone, methyl ethyl ketone (MEK), tetrahydrofuran (THF), methylene chloride (MC), chloroform, dimethyl formamide (DMF), N-methyl-2-pyrrolidone (NMP), dimethyl acetamide (DMAc), cyclohexane, water, methanol, ethanol, propanol, isopropyl alcohol, butanol, or two or more of them.

According to an embodiment of the present disclosure, the slurry may be prepared by dissolving or dispersing the first binder polymer into a solvent for the first binder polymer, adding the inorganic particles thereto and dispersing them. The inorganic particles may be added after they are pulverized in advance to a predetermined average particle diameter. Otherwise, the inorganic particles may be added to a solution containing the first binder polymer dissolved therein, and then pulverized and dispersed, while controlling them to have a predetermined average particle diameter by using a ball milling process, or the like.

According to an embodiment of the present disclosure, there is no particular limitation in the method for forming a porous coating layer by coating the slurry on at least one surface of the porous polymer substrate, and particular examples of the method may include dip coating, die coating, roll coating, comma coating, doctor blade coating, reverse roll coating, direct roll coating, or the like.

A phase separation process may be carried out to form a pore structure with higher quality in the porous coating layer. The phase separation process refers to a process for forming a pore structure in the porous coating layer through the phase separation phenomenon known in the art.

According to an embodiment, the drying step may be carried out by a drying process used conventionally for manufacturing a separator. For example, the coated slurry may be dried in the air for 3-45 seconds or 5-40 seconds. When the drying time is within the above-defined range, it is easier to remove the remaining solvent for the first binder polymer, while not detracting from the productivity.

Next, a coating solution including the second binder polymer, a solvent for the second binder polymer and a non-solvent for the second binder polymer is coated on the top surface of the porous coating layer.

According to the related art, a coating layer including a binder polymer is coated on at least one surface of a porous polymer substrate to form an adhesive layer. Therefore, the coating solution infiltrates into the pores of the porous polymer substrate, resulting in the problem of an increase in the resistance of a separator.

On the contrary, in the method for manufacturing a separator for a secondary battery according to an embodiment of the present disclosure, a coating solution including the second binder polymer is coated on the top surface of the porous coating layer including inorganic particles. Therefore, it is less likely that the coating solution infiltrates into the pores of the porous polymer substrate. Thus, it is possible to improve the problem related with resistance.

According to an embodiment of the present disclosure, reference will be made to the above description about particular types of the second binder polymer. The second binder polymer may be used in an amount of 0.1-20 wt %, or 1-10 wt %, based on 100 wt % of the solvent for the second binder polymer. When the second binder polymer is used within the above-defined range in the coating solution, the separator can easily ensure sufficient adhesion to an electrode.

According to the present disclosure, the solvent for the second binder polymer refers to a liquid capable of dissolving the second binder polymer. According to an embodiment of the present disclosure, the solvent for the second binder polymer may include acetone, methyl ethyl ketone, tetrahydrofuran, methylene chloride (MC), chloroform, dimethyl formamide (DMF), N-methyl-2-pyrrolidone (NMP), dimethyl acetamide (DMAc), cyclohexane, or two or more of them.

According to the present disclosure, the non-solvent for the second binder polymer does not dissolve the second binder polymer and has a boiling point different from the boiling point of water. Since the non-solvent for the second binder polymer having a boiling point different from the boiling point of water is used, phase separation may occur by water and the non-solvent for the second binder polymer during the formation of the adhesive layer. In this manner, the adhesion layer may include a first layer that is in contact with the surface of the porous coating layer, and a second layer integrated with the first layer, facing an electrode and having an average pore size larger than the average pore size of the first layer.

In the method for manufacturing a separator for a secondary battery according to the related art, an adhesive layer for the adhesion of a separator with an electrode is formed by using vapor-induced phase separation. Herein, the term 'vapor-induced phase separation' refers to phase separation occurring when a coating solution including a binder polymer and coated on the surface of a separator is exposed to an environment enriched with water as a non-solvent for a binder polymer. However, when forming such an adhesive layer merely by using vapor-induced phase separation, i.e. by controlling humidity, there are many problems related with processing.

On the contrary, in the method for manufacturing a separator for a secondary battery according to an embodiment of the present disclosure, a coating solution containing a non-solvent for the second binder polymer added thereto is subjected to vapor-induced phase separation so that phase separation may occur not only by water (moisture) but also by the non-solvent for the second binder polymer, thereby facilitating formation of an adhesive layer. Reference will be made to the following description about the vapor-induced phase separation step. When the coating solution including the non-solvent for the second binder polymer is applied on the top surface of the porous coating layer and subjected to vapor-induced phase separation, it is possible to form an adhesive layer including layers different in terms of average pore size depending on the difference in boiling point between water and the non-solvent for the second binder polymer. Therefore, it is possible to improve the problem related with resistance, while ensuring the adhesion between the separator and the electrode.

According to an embodiment of the present disclosure, the non-solvent for the second binder polymer may have a boiling point lower than the boiling point of water.

Since water is applied to the outermost surface layer of the separator through the vapor-induced phase separation, the water content is higher than the content of the non-solvent for the second binder polymer in a portion facing an electrode, and the content of the non-solvent for the second binder polymer is higher than the water content in a portion of the adhesive layer that is in contact with the surface of the porous coating layer. Since water has a higher boiling point as compared to the non-solvent for the second binder polymer and is vaporized more slowly, the second layer having a relatively larger average pore size may be formed in a portion facing the electrode. Meanwhile, since the non-solvent for the second binder polymer has a lower boiling point as compared to water and is vaporized more promptly, the first layer having a relatively smaller average pore size may be formed in a portion that is in contact with the surface of the porous coating layer.

According to an embodiment of the present disclosure, the non-solvent for the second binder polymer may be an alcohol. According to an embodiment of the present disclosure, the alcohol may include methanol, ethanol, propanol, isopropanol, butanol, or two or more of them.

According to an embodiment of the present disclosure, the non-solvent for the second binder polymer may be present in the coating solution in an amount of 30-60 wt %, 35-55 wt %, or 40-60 wt % based on the weight of the non-solvent when gelling of the second binder polymer occurs in the coating solution. When the non-solvent is used within the above-defined range, it is possible to provide an adequate ratio of the average pore size of the first layer to the average pore size of the second layer with ease. For example, it is possible to facilitate providing a ratio of the average pore size of the first layer to the average pore size of the second layer within a range of 0.4 or less. It is also possible to facilitate formation of a Bernard cell pore structure in the second layer.

Therefore, it is possible to further improve the problem related with resistance by reducing the tortuosity by virtue of the first layer having a smaller average pore size than the average pore size of the second layer. It is also possible to easily improve the problem related with resistance by minimizing the contact area between the separator and the electrode, while ensuring the adhesion between the separator and the electrode, by virtue of the second layer having a larger average pore size than the average pore size of the first layer.

Particularly, when the non-solvent for the second binder polymer is used in an amount of 40-60 wt % based on the weight of the non-solvent when gelling of the second binder polymer occurs in the coating solution, it is possible to provide the most adequate ratio of the average pore size of the first layer to the average pore size of the second layer.

According to the present disclosure, the expression 'weight of the non-solvent when gelling of the second binder polymer occurs in the coating solution' refers to the weight of the non-solvent when precipitation occurs in the coating solution through the gelling of the second binder polymer due to the addition of the non-solvent. In addition, the weight may be determined by measuring the weight of the non-solvent at a time point where a clouding point is generated, when the coating solution is positioned on a balance and the non-solvent is added continuously to the coating solution.

According to an embodiment of the present disclosure, the weight of the non-solvent when gelling of the second binder polymer occurs in the coating solution may be 10-30 wt %, 10-20 wt %, or 13-17 wt %, based on 100 wt % of the solvent for the second binder polymer.

For example, when the second binder polymer is 5-10 wt % based on 100 wt % of the solvent for the second binder polymer, the weight of the non-solvent when gelling of the second binder polymer occurs in the coating solution may be 13-17 wt % based on 100 wt % of the solvent for the second binder polymer.

According to an embodiment of the present disclosure, the volume ratio of the non-solvent for the second binder polymer to the solvent for the second binder polymer may be 20:80-60:40. When the volume ratio of the non-solvent for the second binder polymer to the solvent for the second binder polymer satisfies the above-defined range, the separator can further ensure sufficient adhesion to an electrode and have a suitable pore size and porosity, thereby facilitating improvement of the problem related with resistance.

Next, the coated coating solution is dried, while maintaining a relative humidity of 35-40%, to form an adhesive layer.

In the method for manufacturing a separator for a secondary battery according to the present disclosure, the step of drying the coating solution, while maintaining a relative humidity of 35-40%, is a process for forming pores in the adhesive layer by using vapor-induced phase separation. When phase separation of the coating solution is carried out by using vapor-induced phase separation, it is possible to carry out phase separation in such a manner that the second binder polymer may form a gradient in concentration in the thickness direction of the separator and the second binder polymer may be present in a larger amount on the surface of the separator where the separator is adhered to an electrode.

According to an embodiment of the present disclosure, in the step of drying the coating solution, while maintaining a relative humidity of 35-40%, water may be introduced in a gaseous state. When introducing and adding water in a gaseous state, phase separation may be carried out by using a smaller amount of water and drying of the coating solution may be facilitated.

Herein, the temperature of addition of water in a gaseous state or microdroplet state may be 15-70° C. When the temperature of addition of water in a gaseous state satisfies the above-defined range, it is easier for water to maintain a gaseous state, and the drying rate of the coating solution is ensured, thereby providing improved productivity.

In the step of drying the coating solution, while maintaining a relative humidity of 35-40%, phase separation occurs under such atmosphere of water that the vapor pressure of water becomes 35-40% based on the saturated vapor pressure. When the vapor pressure of water satisfies the above-defined range, the second binder polymer may be distributed in a sufficiently larger amount on the surface of the separator, and the adhesion of the separation to the electrode may be ensured. In addition, a Bernard cell pore structure may be developed well.

When the vapor pressure of water satisfies the above-defined range, it is easier to prevent a problem of degradation of the adhesion between the porous coating layer including inorganic particles and the adhesive layer, caused by an excessively high level of humidification and excessive migration of the second binder polymer toward the separator surface. Therefore, it is easier to ensure sufficient adhesion between the separator and the electrode.

In addition, it is easier to provide a ratio of the average pore size of the first layer to the average pore size of the second layer of 0.25-0.4, and to provide the second layer with an average pore size of 1-4 μm.

On the contrary, when the vapor pressure of water is less than 35%, such an insufficient level of humidification allows phase separation merely by the non-solvent for the second binder polymer. Therefore, it is difficult to form an adhesive layer including layers different in terms of average pore size.

The separator for a secondary battery as described above may be interposed between a positive electrode and a negative electrode to obtain a secondary battery.

The secondary battery may be a lithium secondary battery, preferably. The lithium secondary battery may include a lithium metal secondary battery, a lithium-ion secondary battery, a lithium polymer secondary battery, a lithium-ion polymer secondary battery, or the like.

The electrodes used in combination with the separator according to the present disclosure are not particularly limited, and may be obtained by allowing an electrode active material layer including an electrode active material, a conductive material and a binder to be bound to an electrode current collector through a method generally known in the art.

Among the electrode active materials, non-limiting examples of the positive electrode active material may include, but are not limited to: layered compounds, such as lithium cobalt composite oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O$; and $LiMnO_2$; lithium copper oxide ($Li_2CuO_2$); vanadium oxides such as $LiV_3O_8$, $LiV_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x is 0.01-0.3); lithium manganese composite oxides represented by the chemical formula of $LiMn_{2-x}M_xO_2$ (wherein M is Co, Ni, Fe, Cr, Zn or Ta, and x is 0.01-0.1) or $Li_2Mn_3MO_8$ (wherein M=Fe, Co, Ni, Cu or Zn); $LiMn_2O_4$ in which Li is partially substituted with an alkaline earth metal ion; disulfide compounds; $Fe_2(MoO_4)_3$; or the like Non-limiting examples of the negative electrode active material include conventional negative electrode active materials that may be used for the negative electrodes for conventional electrochemical devices. Particular examples of the negative electrode active material may include lithium-intercalating materials, such as lithium metal or lithium alloys, carbon, petroleum coke, activated carbon, graphite or other carbonaceous materials.

Non-limiting examples of the positive electrode current collector may include foil made of aluminum, nickel or a combination thereof. Non-limiting examples of the negative electrode current collector may include foil made of copper, gold, nickel, copper alloys or a combination thereof.

According to an embodiment of the present disclosure, the conductive material used in the negative electrode and the positive electrode may be added generally in an amount of 1-30 wt % based on the total weight of each active material layer. The conductive material is not particularly limited, as long as it causes no chemical change in the corresponding battery and has conductivity. For example, the conductive material may include: graphite, such as natural graphite or artificial graphite; carbon black, such as acetylene black, Ketjen black, channel black, furnace black, lamp black or thermal black; conductive fibers, such as carbon fibers or metallic fibers; fluorocarbon; metal powder, such as aluminum or nickel powder; conductive whisker, such as zinc oxide or potassium titanate; conductive metal oxide, such as titanium oxide; and conductive materials, such as polyphenylene derivatives.

According to an embodiment of the present disclosure, the binder used in the negative electrode and the positive electrode is an ingredient which assists binding between the electrode active material and the conductive material and binding to the current collector. In general, the binder may be added in an amount of 1-30 wt % based on the total weight of each active material layer. Particular examples of the binder may include polyvinylidene fluoride (PVDF), polyacrylic acid (PAA), polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butyrene rubber, fluororubber, various copolymers, or the like.

According to an embodiment of the present disclosure, the secondary battery includes an electrolyte, which may include an organic solvent and a lithium salt. In addition, the electrolyte may include an organic solid electrolyte or an inorganic solid electrolyte.

Particular examples of the organic solvent may include aprotic organic solvents, such as N-methyl-2-pyrrolidone, ethylene carbonate, propylene carbonate, butylene carbonate, dimethyl carbonate, diethyl carbonate, γ-butyrolactone, 1,2-dimethoxyethane, tetrahydroxy franc, 2-methyl tetrahydrofuran, dimethyl sulfoxide, 1,3-dioxolan, formamide, dimethyl formamide, dioxolan, acetonitrile, nitromethane, methyl formate, methyl acetate, phosphoric acid triesters, trimethoxy methane, dioxolan derivatives, sulforane, methyl sulforane, 1,3-dimethyl-2-imidazolidinone, propylene carbonate derivatives, tetrahydrofuran derivatives, ethers, methyl propionate, ethyl propionate, or the like.

The lithium salt is a material which can be dissolved in the non-aqueous electrolyte with ease, and particular examples thereof may include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, lithium chloroborate, lithium lower aliphatic carboxylate, lithium tetraphenyl borate, imide, or the like.

In addition, the electrolyte may further include pyridine, triethyl phosphite, triethanolamine, cyclic ethers, ethylene diamine, n-glyme, triamide hexaphosphate, nitrobenzene derivatives, sulfur, quinone imine dyes, N-substituted oxazolidinone, N,N-substituted imidazolidine, ethylene glycol dialkyl ether, ammonium salt, pyrrole, 2-methoxyethaol and aluminum trichloride in order to improve the charge/discharge characteristics, flame resistance, or the like. Optionally, the electrolyte may further include a halogen-containing solvent, such as carbon tetrachloride or trifluoroethylene, in order to impart non-combustibility. The electrolyte may further include carbon dioxide gas in order to improve the high-temperature storage characteristics.

Particular examples of the organic solid electrolyte may include polyethylene derivatives, polyethylene oxide derivatives, polypropylene oxide derivatives, phosphate ester polymer, polyagitation lysine, polyester sulfide, polyvinyl alcohol, polyvinylidene fluoride, polymers containing an ionically dissociatable group, or the like.

Particular examples of the inorganic solid electrolyte may include nitrides, halides and sulfates of Li, such as $Li_3N$, LiI, $Li_3NI_2$, $Li_3N—LiI—LiOH$, $LiSiO_4$, $LiSiO_4—LiI—LiOH$, $Li_2SiS_3$, $Li_4SiO_4$, $Li_4SiO_4—LiI—LiOH$ and $Li_3PO_4—Li_2S—SiS_2$.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

According to an embodiment of the present disclosure, the separator for a secondary battery may be applied to a battery through lamination, stacking and folding of the separator with electrodes, besides a conventional process, winding.

According to an embodiment of the present disclosure, the separator for a secondary battery may be interposed between a positive electrode and a negative electrode. When an electrode assembly is formed by assembling a plurality of cells or electrodes, the separator may be interposed between the adjacent cells or electrodes. The electrode assembly may have various structures, such as a simple stack type, a jelly-roll type, a stacked-folded type, a laminated-stacked type, or the like.

MODE FOR DISCLOSURE

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

A binder polymer solution was prepared by adding 5 parts by weight of an acrylic copolymer (Toyo Chem, CSB-130) as a first binder polymer to water and agitating the resultant mixture at 25° C. for about 2 hours. Next, 95 parts by weight of $Al(OH)_3$ having an average particle diameter of 500 nm was added to the resultant binder polymer solution, followed by dispersion, to prepare slurry. Herein, the weight ratio of the inorganic particles to the first binder polymer in the slurry was 95:5.

The prepared slurry was coated on one surface of a polyethylene porous substrate having a thickness of 9 μm through a gravure coating process and the coating thickness was controlled to about 2 μm to obtain a separator substrate provided with a porous coating layer on one surface thereof.

Next, polyvinylidene fluoride-co-hexafluoropropylene (PVDF-HFP) as a second binder polymer was added to a mixture of acetone as a solvent for the second polymer with ethanol as a non-solvent for the second binder polymer in such a manner that the content of the second binder polymer might be 5 wt % based on 100 wt % of the solvent for the second binder polymer, and dissolved therein at 25° C. for about 30 minutes to obtain a coating solution. Herein, the content of ethanol added to the coating solution was 7.5 wt % based on 100 wt % of the solvent for the second binder polymer, considering that the content of ethanol when gelling of PVDF-HFP occurs in the coating solution was 15 wt % based on 100 wt % of the solvent for the second binder polymer.

The prepared coating solution was coated on the top surface of the porous coating layer of the separator substrate provided with the porous coating layer through a gravure coating process, and then dried at 40-60° C., while maintaining a relative humidity of 35%, to obtain a separator having an adhesive layer formed on the top surface of the porous coating layer of the separator substrate provided with the porous coating layer.

In the resultant separator, the porous coating layer and the adhesive layer had a thickness of 2 μm and 1 μm, respectively.

Example 2

A separator for a secondary battery was obtained in the same manner as Example 1, except that ethanol was added in an amount of 1.5 wt % based on 100 wt % of the solvent for the second binder polymer, considering that the content of ethanol when gelling of PVDF-HFP occurs in the coating solution was 15 wt % based on 100 wt % of the solvent for the second binder polymer.

Example 3

A separator for a secondary battery was obtained in the same manner as Example 1, except that ethanol was added in an amount of 4.5 wt % based on 100 wt % of the solvent for the second binder polymer, considering that the content of ethanol when gelling of PVDF-HFP occurs in the coating solution was 15 wt % based on 100 wt % of the solvent for the second binder polymer.

Example 4

A separator for a secondary battery was obtained in the same manner as Example 1, except that ethanol was added in an amount of 10.5 wt % based on 100 wt % of the solvent for the second binder polymer, considering that the content of ethanol when gelling of PVDF-HFP occurs in the coating solution was 15 wt % based on 100 wt % of the solvent for the second binder polymer.

Comparative Example 1

A separator for a secondary battery was obtained in the same manner as Example 1, except that ethanol was not added, and the coating solution was prepared by dissolving PVDF-HFP as a second binder polymer in acetone as a solvent.

In the resultant separator, the porous coating layer and the adhesive layer had a thickness of 2 μm and 1 μm, respectively.

Comparative Example 2

A separator for a secondary battery was obtained in the same manner as Example 1, except that vapor-induced phase separation step of carrying out drying, while maintaining a specific range of relative humidity, was not carried out.

In the resultant separator, the porous coating layer and the adhesive layer had a thickness of 2 μm and 1 μm, respectively.

Comparative Example 3

A separator for a secondary battery was obtained in the same manner as Example 1, except that vapor-induced phase separation step was carried out, while maintaining a relative humidity of 25%.

In the resultant separator, the porous coating layer and the adhesive layer had a thickness of 2 μm and 1 μm, respectively.

Test Example 1: Analysis of Pore Structure of Adhesive Layer of Separator

FIGS. 2-7 are scanning electronic microscopic (SEM) images of the adhesive layers of the separators according to Examples 1-4 and Comparative Examples 1-3.

As can be seen from FIGS. 2-5, each of the adhesive layers of the separators according to Examples 1-4 is provided with two layers different in terms of average pore size, and the second layer facing the electrode has a larger average pore size than the average pore size of the first layer that is in contact with the surface of the porous coating layer.

Figure 2:
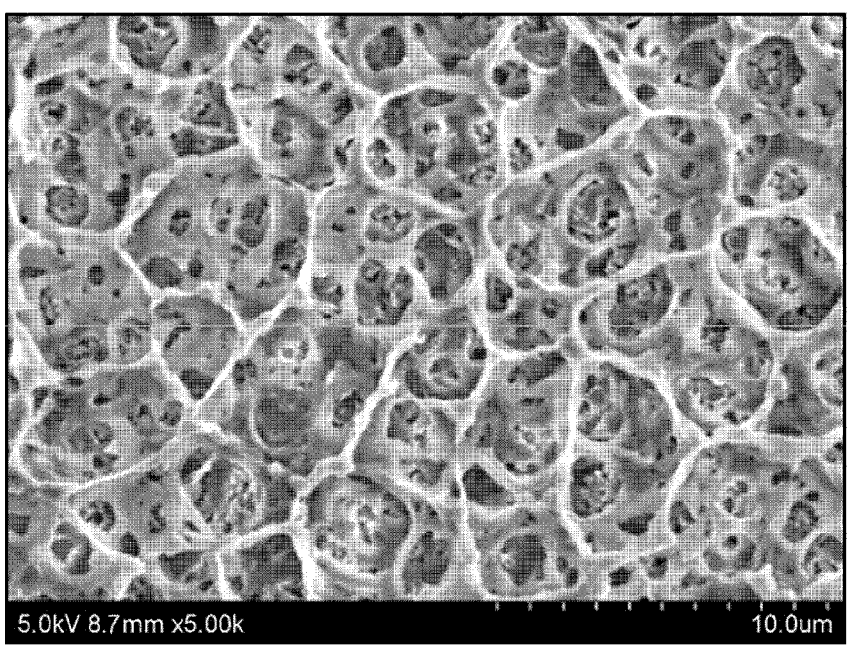
FIG. 2 is a scanning electron microscopic (SEM) image illustrating the adhesive layer of the separator for a secondary battery obtained according to Example 1.
Figure 3:
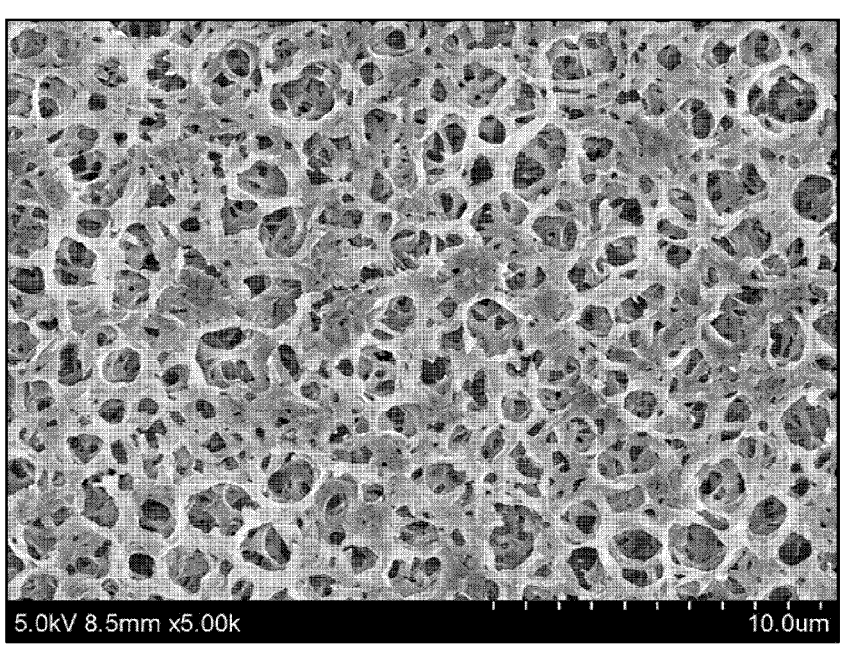
FIG. 3 is an SEM mage illustrating the adhesive layer of the separator for a secondary battery obtained according to Example 2.
Figure 4:
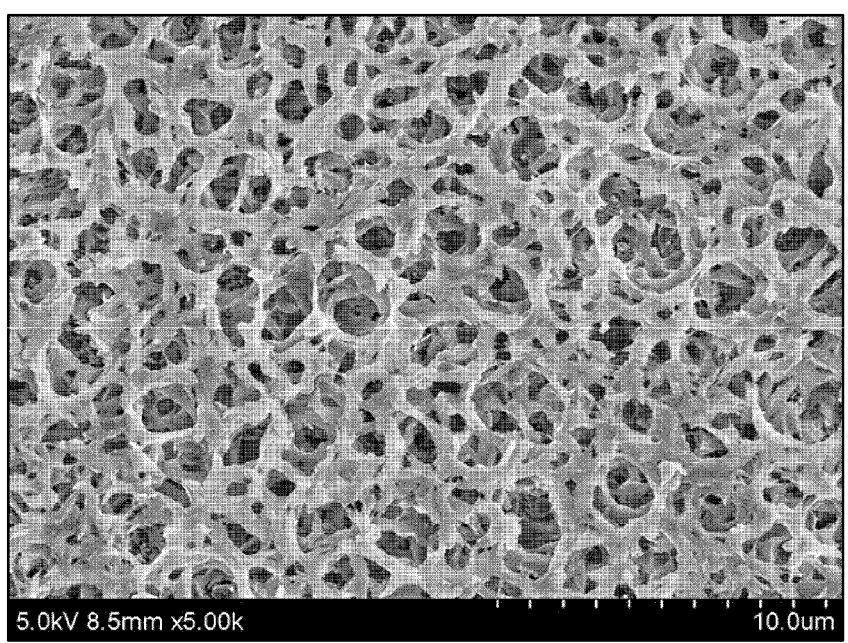
FIG. 4 is an SEM mage illustrating the adhesive layer of the separator for a secondary battery obtained according to Example 3.
Figure 5:
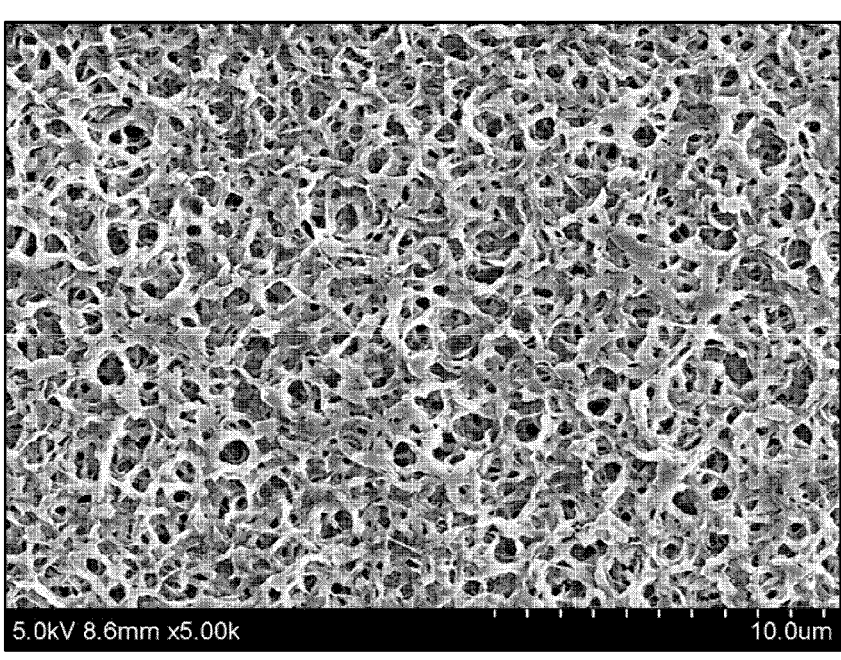
FIG. 5 is an SEM mage illustrating the adhesive layer of the separator for a secondary battery obtained according to Example 4.

Particularly, as can be seen from FIGS. 2 and 4, each of the adhesive layers of the separators according to Examples 1 and 3 shows a well-developed Bernard cell structure in the second layer facing the electrode.

Figure 6:
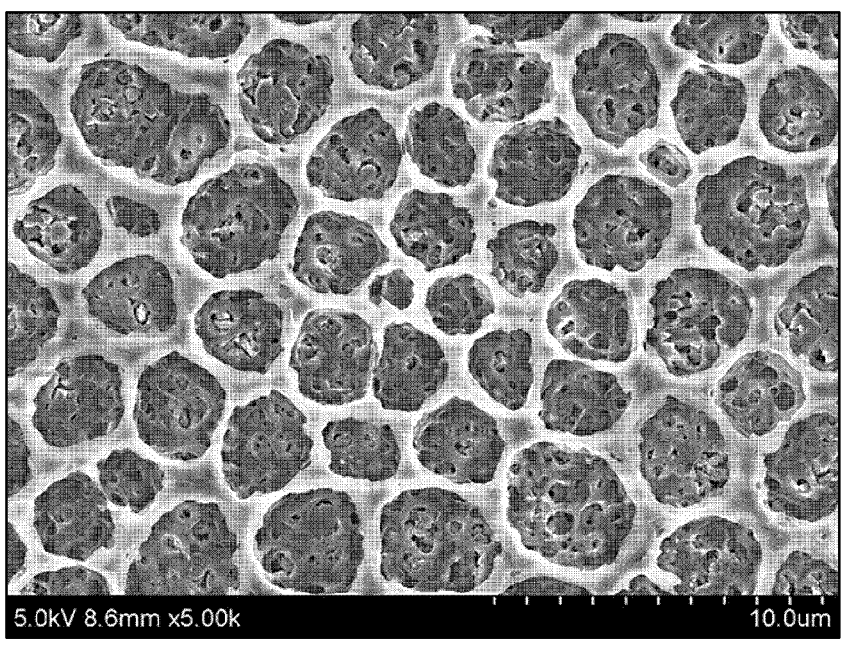
FIG. 6 is an SEM mage illustrating the adhesive layer of the separator for a secondary battery obtained according to Comparative Example 1.

On the contrary, as can be seen from FIG. 6, the adhesive layer of the separator according to Comparative Example 1 has no layers different in terms of average pore size.

Figure 7:
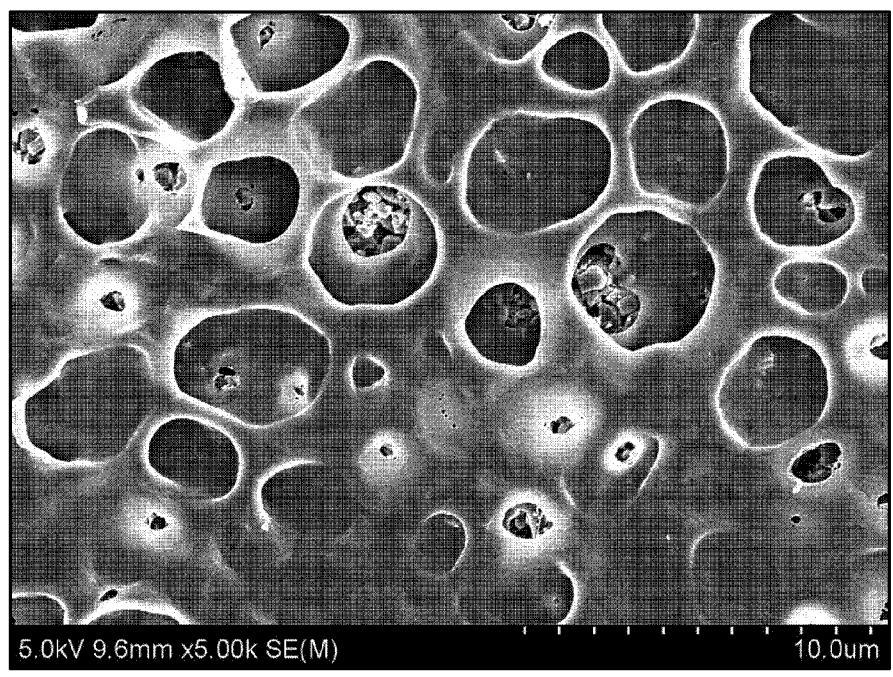
FIG. 7 is an SEM mage illustrating the adhesive layer of the separator for a secondary battery obtained according to Comparative Example 2.

As can be seen from FIG. 7, the adhesive layer of the separator according to Comparative Example 2 also has no layers different in terms of average pore size.

Figure 8:
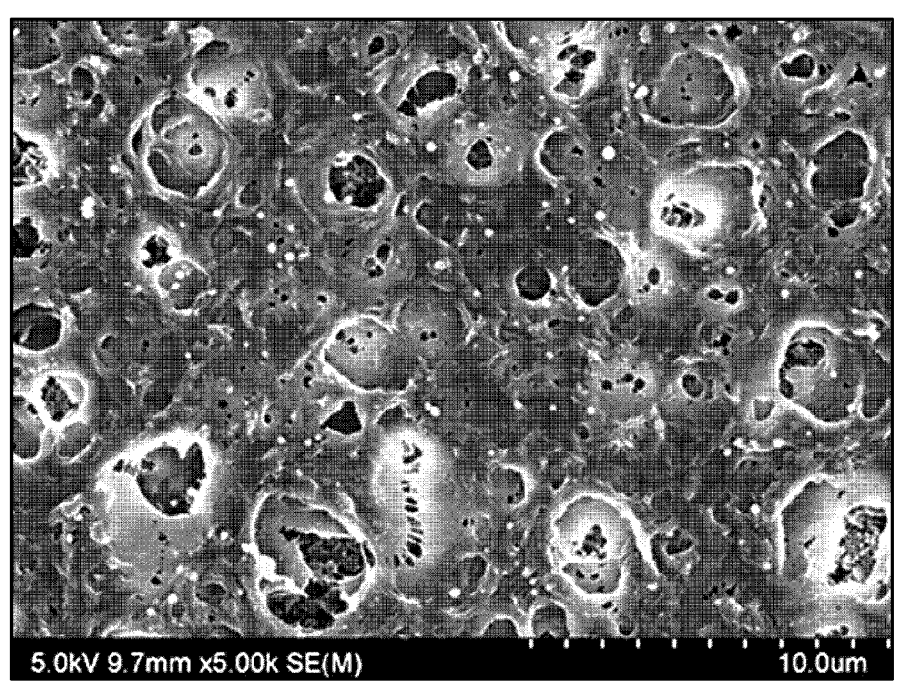
FIG. 8 is an SEM mage illustrating the adhesive layer of the separator for a secondary battery obtained according to Comparative Example 3.

As can be seen from FIG. 8, the adhesive layer of the separator according to Comparative Example 3 also has no layers different in terms of average pore size. In addition, the adhesive layer of the separator according to Comparative Example 3 does not have a well-developed Bernard cell structure.

Test Example 2: Analysis of Physical Properties of Separator

In the adhesive layer of each of the separators according to Examples 1-4 and Comparative Examples 1-3, the average pore size of the second layer facing the electrode, average pore size of the first layer that is in contact with the surface of the porous coating layer, air permeability, electrical resistance and adhesion to the electrode were determined. The results are shown in the following Table 1.

(1) Determination of Average Pore Size of First Layer and Second Layer

The average pore size of the first layer and that of the second layer of the adhesive layer of each of the separators according to Examples 1-4 were determined through a mercury porosimeter.

The average pore size of the adhesive layer of each of the separators according to Comparative Examples 1-3 was determined through a mercury porosimeter.

(2) Determination of Air Permeability

The air permeability (Gurley value) was determined by the method as defined in ASTM D726-94. Herein, the air permeability value was determined as time (second), i.e. air permeation time, required for 100 cc of air to pass through a section of 1 in$^2$ of the separator according to each of Examples 1-4 and Comparative Examples 1-3 under a pressure of 12.2 inH$_2$O.

(3) Determination of Electrical Resistance

The electrical resistance of the separator for a secondary battery according to each of Examples 1-4 and Comparative Examples 1-3 was determined as follows. A coin cell was obtained by using each separator, and then impedance of each separator was determined under predetermined multiple frequency conditions by using electrochemical impedance spectroscopy (EIS) depending on frequency. The coin cell was manufactured as follows.

Manufacture of Negative Electrode

First, artificial graphite as a negative electrode active material, denka black as a conductive material and polyvinylidene fluoride (PVDF) as a binder were mixed at a weight ratio of 75:5:20, and N-methyl pyrrolidone as a solvent was added to the resultant mixture to prepare negative electrode slurry.

The negative electrode slurry was coated on a copper current collector to a loading amount of 3.8 mAh/cm$^2$, followed by drying, to obtain a negative electrode.

Manufacture of Positive Electrode

First, LiCoO$_2$ as a positive electrode active material, denka black as a conductive material and polyvinylidene fluoride (PVDF) as a binder were mixed at a weight ratio of 85:5:10, and the resultant mixture was added to N-methyl pyrrolidone (NMP) as a solvent to prepare positive electrode active material slurry. The positive electrode active material slurry was coated on a sheet-like aluminum current collector, followed by drying, to form a positive electrode active material layer to a final positive electrode loading amount of 3.3 mAh/cm$^2$.

Manufacture of Coin Cell

The separator for a secondary battery according to each of Examples 1-4 and Comparative Examples 1-3 was interposed between the negative electrode and the positive electrode obtained as described above, and a non-aqueous electrolyte (1 M LiPF$_6$, ethylene carbonate (EC)/propylene carbonate (PC)/diethyl carbonate (DEC), volume ratio=3:3:4) was injected thereto to obtain a coin cell.

(4) Determination of Adhesion to Electrode

The adhesion between the separator according to each of Examples 1-4 and Comparative Examples 1-3 and the electrode was determined as follows.

First, natural graphite, SBR, CMC and a conductive material (weight ratio 90:2.5:2.5:5) were introduced to water to obtain negative electrode slurry, and the negative electrode slurry was coated on copper foil (thickness: 20 μm) at a loading amount of 5 mg/cm$^2$ and then dried. Then, the resultant structure was pressed at 90° C. under 8.5 MPa and cut into a size of 60 mm (length)×25 mm (width) to obtain a negative electrode.

Each of the separators obtained from Examples 1-4 and Comparative Examples 1-3 was cut into a size of 70 mm (length)×25 mm (width), and laminated with the negative electrode by using a press at 60° C. under 6.54 MPa to obtain a specimen. The prepared specimen was attached to and fixed on a glass plate by using a double-sided tape in such a manner that the negative electrode might face the glass plate. Then, the separator portion of the specimen was peeled at a rate of 25 mm/min with an angle of 180° at 25° C., and the strength was measured.

TABLE 1

| | Ex. 1 | Ex. 2 | Ex. 3 | Ex. 4 | Comp. Ex. 1 | Comp. Ex. 2 | Comp. Ex. 3 |
|---|---|---|---|---|---|---|---|
| Content (%) of non-solvent based on weight of non-solvent for second binder polymer when gelling occurs | 50 | 10 | 30 | 70 | — | 50 | 50 |
| Humidification (%) | 35 | 35 | 35 | 35 | 35 | — | 25 |
| Average pore size (μm) of second layer | 4 | 2 | 3 | 1 | 4 (no layers different in terms of average pore size) | 1 (no layers different in terms of average pore size) | 1 (no layers different in terms of average pore size) |
| Average pore size (μm) of first layer | 1 | 1.5 | 1.2 | 0.7 | | | |

TABLE 1-continued

|  | Ex. 1 | Ex. 2 | Ex. 3 | Ex. 4 | Comp. Ex. 1 | Comp. Ex. 2 | Comp. Ex. 3 |
|---|---|---|---|---|---|---|---|
| Thickness (μm) | 15.6 | 15.3 | 15.2 | 15.4 | 15.4 | 15.2 | 15.3 |
| Air permeability (Gurley) (s/100 cc) | 205 | 265 | 221 | 200 | 500 | 450 | 550 |
| Electrode-separator Lami force (gf/25 mm) | 112 | 65 | 110 | 64 | 60 | 10 | 20 |
| Electrical resistance (Ω) | 0.68 | 1.5 | 0.72 | 0.7 | 1.9 | 2.0 | 0.9 |

As can be seen from Table 1, the adhesive layer of the separator according to each of Examples 1-4 is provided with layers different in terms of average pore size formed by phase separation caused by the non-solvent for the second binder polymer and water, and the second layer facing the electrode has a larger average pore size than the average pore size of the first layer that is in contact with the surface of the porous coating layer. In addition, the separator ensures sufficient adhesion to the electrode and shows excellent air permeability and electrical resistance characteristics.

In addition, as compared to Examples 2 and 4 including the non-solvent in an amount of 10 wt % and 70 wt %, respectively, based on the weight of the non-solvent when gelling of PVDF-HFP occurs in each coating solution, Examples 1 and 3 including the non-solvent in an amount of 30 wt % and 50 wt %, respectively, based on the weight of the non-solvent when gelling of PVDF-HFP occurs in each coating solution shows a lower ratio, i.e. 0.4 or less, of the average pore size of the first layer to the average pore size of the second layer. In addition, Examples 1 and 3 are more improved in terms of electrical resistance. Further, it can be seen that Example 1 provides better results in terms of electrical resistance and adhesion to the electrode, as compared to Example 3.

On the contrary, the adhesive layer of the separator according to Comparative Example 1 includes an adhesive layer formed merely through vapor-induced phase separation, i.e. water, and any non-solvent is not contained in the coating solution. Thus, the adhesive layer has no layers different in terms of average pore size. Therefore, it can be seen that the separator shows significantly high air permeation time and electrical resistance.

The adhesive layer of the separator according to Comparative Example 2 includes an adhesive layer formed merely through phase separation caused by the non-solvent for the second binder polymer, not by vapor-induced phase separation, i.e. water. Thus, the adhesive layer has no layers different in terms of average pore size. In addition, it can be seen that the separator cannot ensure sufficient adhesion to the electrode and shows high electrical resistance and air permeation time.

In the case of the adhesive layer of the separator according to Comparative Example 3, the humidification is excessively low, there is almost no phase separation, and phase separation occurs merely by the non-solvent for the second binder polymer, alcohol. Thus, the adhesive layer has no layers different in terms of average pore size. In addition, it can be seen that the separator shows high air permeation time and cannot ensure sufficient adhesion to the electrode.

What is claimed is:

1. A separator for a secondary battery, comprising:
a porous polymer substrate;
a porous coating layer on at least one surface of the porous polymer substrate, wherein the porous coating layer comprises a plurality of inorganic particles and a first binder polymer that interconnects and fixes the inorganic particles; and
an adhesive layer on a surface of the porous coating layer opposite to the porous polymer substrate, wherein the adhesive layer comprises a second binder polymer, wherein the adhesive layer comprises a layered structure comprising a first layer in contact with the surface of the porous coating layer opposite to the porous polymer substrate, and a second layer integrated with the first layer and the second layer faces an electrode, the layered structure being formed by phase separation of a solution comprising the second binder polymer, a solvent, and a non-solvent, coated on the surface of the porous coating layer, and
wherein the second layer has an average pore size larger than an average pore size of the first layer.

2. The separator for the secondary battery according to claim 1, wherein a ratio of the average pore size of the first layer to the average pore size of the second layer is 0.75 or less.

3. The separator for the secondary battery according to claim 1, wherein a ratio of the average pore size of the first layer to the average pore size of the second layer is 0.4 or less.

4. The separator for the secondary battery according to claim 1, wherein the second layer has an average pore size of 0.1 μm to 10 μm.

5. The separator for the secondary battery according to claim 1, wherein the first layer has an average pore size of 0.1 μm to 7 μm.

6. The separator for the secondary battery according to claim 1, wherein the first binder polymer comprises at least one of an acrylic polymer, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethyl polyvinyl alcohol, cyanoethyl cellulose, cyanoethyl sucrose, pullulan, carboxymethyl cellulose, acrylonitrile-styrene-butadiene copolymer, or polyimide.

7. The separator for the secondary battery according to claim 1, wherein the second binder polymer comprises at least one of polyvinylidene fluoride-co-hexafluoropropylene, polyvinylidene fluoride-co-trichloroethylene, polyvinylidene fluoride-co-tetrafluoroethylene, or polyvinylidene fluoride-co-trifluoroethylene.

8. The separator for the secondary battery according to claim 1, wherein the separator has an adhesion to an electrode of 60 gf/25 mm to 250 gf/25 mm.

9. The separator for the secondary battery according to claim 1, wherein the separator has an air permeability of 10 s/100 cc to 500 s/100 cc.

10. The separator for the secondary battery according to claim 1, wherein the separator has an electric resistance of 0.1Ω to 3Ω.

11. A secondary battery, comprising:

a positive electrode, a negative electrode, and a separator interposed between the positive electrode and the negative electrode, wherein the separator is the same as defined in claim 1.

* * * * *